(12) United States Patent
Kim et al.

(10) Patent No.: US 12,449,460 B2
(45) Date of Patent: Oct. 21, 2025

(54) SYSTEM FOR MEASURING PERFORMANCE OF EQUIPMENT UNDER TEST, AND METHOD THEREFOR

(71) Applicant: NATIONAL RADIO RESEARCH AGENCY, Naju-si (KR)

(72) Inventors: Kang Wook Kim, Gwangju (KR); Soon Soo Oh, Gwangju (KR); Young Bae Jung, Daejeon (KR); Jong Hyuk Lim, Icheon-si (KR)

(73) Assignee: NATIONAL RADIO RESEARCH AGENCY, Naju-si (KR)

( * ) Notice: Subject to any disclaimer, the term of this patent is extended or adjusted under 35 U.S.C. 154(b) by 68 days.

(21) Appl. No.: 18/613,144

(22) Filed: Mar. 22, 2024

(65) Prior Publication Data

US 2025/0180617 A1   Jun. 5, 2025

Related U.S. Application Data

(63) Continuation of application No. PCT/KR2021/018457, filed on Dec. 7, 2021.

(30) Foreign Application Priority Data

Nov. 19, 2021   (KR) .................... 10-2021-0160127

(51) Int. Cl.
*G01R 29/10* (2006.01)
*G01R 29/08* (2006.01)
*H04B 17/15* (2015.01)

(52) U.S. Cl.
CPC ......... *G01R 29/10* (2013.01); *G01R 29/0878* (2013.01); *G01R 29/0892* (2013.01); *H04B 17/15* (2015.01)

(58) Field of Classification Search
None
See application file for complete search history.

(56) References Cited

U.S. PATENT DOCUMENTS 7,119,739 B1 * 10/2006 Struckman ............. G01R 29/10
                                                    342/372
2006/0057985 A1 * 3/2006 Woo ....................... G01R 29/10
                                                    455/147

(Continued)

FOREIGN PATENT DOCUMENTS

CN      111257658 A     6/2020
JP      2005502860 A    1/2005

(Continued)

*Primary Examiner* — Wilson Lee
(74) *Attorney, Agent, or Firm* — NKL Law; Jae Youn Kim

(57) ABSTRACT

Disclosed are a system and a method for a high-speed performance measurement. The system includes: a fixing part; a positioner for controlling the rotation of the equipment by controlling the fixing part; a measurement probe; a curved reflective plate for reflecting, in the direction of the measurement probe, an electromagnetic wave radiated by the equipment and transforming the spherical wave of the measurement probe into a plane wave at the position where the equipment is provided; an arc structure including an arc arranged to be adjacent to the fixing part; a probe set including near-filed probes arranged to be spaced predetermined intervals apart from each other on the inner side of the arc; and a control unit, which receives, through a signal analyzer, signal data corresponding to an input signal from some of near-filed probes and the measurement probe.

12 Claims, 10 Drawing Sheets

(56) References Cited

U.S. PATENT DOCUMENTS

| | | | |
|---|---|---|---|
| 2010/0164815 A1* | 7/2010 | Woo | G01R 29/10 |
| | | | 343/703 |
| 2017/0012714 A1 | 1/2017 | Kildal | |
| 2020/0119460 A1* | 4/2020 | Maruo | H01Q 3/18 |
| 2021/0265742 A1* | 8/2021 | Lee | G01R 29/10 |
| 2021/0341528 A1* | 11/2021 | Sanchez Hernandez | |
| | | | H01Q 1/38 |

FOREIGN PATENT DOCUMENTS

| | | |
|---|---|---|
| JP | 20200058052 A | 5/2020 |
| JP | 2021039050 A | 3/2021 |
| KR | 20100044644 A | 4/2010 |
| KR | 20200058052 A | 5/2020 |
| KR | 20200093759 A | 8/2020 |
| KR | 20210086620 A | 7/2021 |
| WO | 2020213093 A1 | 10/2020 |

* cited by examiner

SYSTEM FOR MEASURING PERFORMANCE OF EQUIPMENT UNDER TEST, AND METHOD THEREFOR

TECHNICAL FIELD

The present disclosure relates to a system for measuring performance of equipment under test and a method therefor. More specifically, the present disclosure relates to a system capable of rapidly measuring the performance of multiple measurement items for verification and post management of equipment under test including an antenna under test and a method therefor.

The present disclosure is a result of research conducted as part of a research and development project (development project of high-speed measurement technology for antenna under test applied with new technology) of the National Radio Research Institute of the Ministry of Science and ICT.

BACKGROUND ART

As demand for radio wave resources increases rapidly, such as increased wireless traffic and large-capacity data transmission, market demand for the millimeter wave band, a new radio wave resource, is also expanding. In addition, as the use of millimeter wave band mobile communication devices is expected to increase rapidly, there is an urgent need to develop technology for processing the verification and post management test of a millimeter wave band antenna under test included in equipment under test such as a base station and a terminal device at a high speed, and the need for technology capable of measuring various measurement items for the verification and post management test of equipment under test (specifically, the antenna under test included therein) at a high speed is increasing.

In order to measure the performance of equipment under test (EUT) including an antenna under test (AUT), a measurement probe is disposed around the EUT to measure, and to measure (test) such an AUT, measuring the signal radiation performance of the AUT while moving one or a few probes, as in the existing method, inevitably takes a considerable amount of time and resources.

FIG. 1A and FIG. 1B are diagrams for explaining an example of a conventional AUT measurement method.

FIG. 1A illustrates an AUT performance measurement method of a near field to far field transform (NFTF) scheme, which is widely used for measuring performance of an AUT (or EUT) in a recent high frequency band.

As shown in FIG. 1A, the NFTF AUT measurement method includes a planar, a cylindrical, and a spherical performance measurement methods.

These methods may be selectively used depending on a directivity or radiation pattern of the AUT.

The conventional method generally uses a method of measuring radiation performance (radiation pattern, signal strength, etc.) by receiving and analyzing a signal output from the equipment under test (AUT) while moving a probe for receiving the signal output from the equipment under test (AUT) for each predetermined grid point.

In addition, in the case of cylindrical or spherical measurement methods, measurement is performed by rotating the equipment under test (AUT) along with the movement of the probe, and if necessary, in the case of a spherical measurement method, a plurality of probes are installed in the arc corresponding to one outer circumference of the sphere, and signal reception is performed for each grid point corresponding to the entire sphere.

In the case of the conventional NFTF measurement method, multiple probes may be used simultaneously, which greatly shortens the measurement time, but it has the disadvantage of not being able to measure EVM or blocking, which are some of the measurement items required for verification and post management of EUT.

FIG. 1B is a diagram for explaining a conventional indirect far-field (IFF) measurement method. The IFF measurement method, also called compact antenna test range (CATR), is a method of reflecting electromagnetic waves radiated from a probe from a reflector in the EUT direction, and the reflector is designed so that the electromagnetic wave radiated in a spherical shape from the probe becomes a plane wave in the EUT area. The area where the quality of a plane wave is maintained is called the quiet zone, and the EUT is located and measured within the quiet zone.

In the case of the conventional IFF method, all measurements required for verification and post management of EUT may be performed, but it has the disadvantage that it takes a long time to measure because of using only one probe.

PRIOR ART DOCUMENT

Patent Document: Korean Patent Publication No. 1020200093759 entitled "Method for Measuring Antenna Performance and Chamber Therefor"

SUMMARY

Technical Goals

The present disclosure has been devised to solve the problems of the prior art, and the problem to be solved by the present disclosure is to provide a system capable of rapidly measuring the performance of multiple measurement items for verification and post management of EUT.

Technical Solutions

According to one aspect of the present disclosure, there is provided a system for measuring performance of equipment under test, including a fixing part for fixing equipment under test which is to be tested, a positioner for controlling a rotation of the equipment under test by controlling the fixing part, a measurement probe which is installed at a predetermined location spaced apart from the fixing part while being hidden from a line-of-sight of the equipment under test, a curved reflector formed to reflect an electromagnetic wave radiated by the equipment under test in a direction of the measurement probe and to transform a spherical wave of the measurement probe into a plane wave at a location where the equipment under test is installed, an arc structure including an arc disposed around the fixing part so that the location of the equipment under test becomes a central point, a probe set including a plurality of near-field probes disposed to be spaced predetermined intervals apart from each other on an inner side of the arc, and a control unit for measuring performance of the equipment under test by receiving signal data corresponding to an input signal from at least some of the plurality of near-field probes and the measurement probe through a signal analyzer.

In an embodiment, the arc may be formed so that the plurality of near-field probes disposed on the inner side of the arc are located on an opposite side of the curved reflector with respect to the equipment under test.

In an embodiment, the arc may be formed so that the plurality of near-field probes disposed on the inner side of the arc are located on lateral sides of the equipment under test based on a direction in which the equipment under test faces the curved reflector.

In an embodiment, the control unit may be configured to, by controlling the positioner, perform a test while rotating the equipment under test at a predetermined angle in an elevation direction and then rotating the equipment under test in an azimuth direction.

In an embodiment, the control unit may be configured to determine a beam peak of the equipment under test based on signal data measured through at least some of the plurality of near-field probes, control the positioner to rotate the equipment under test so that the beam peak of the equipment under test faces the reflector, and measure the performance of the equipment under test based on signal data measured through the measurement probe.

In an embodiment, the control unit may be configured to, in order to determine the beam peak of the equipment under test, generate near-field data of the equipment under test based on the signal data measured through at least some of the plurality of near-field probes, convert the near-field data of the equipment under test into far-field data, and determine the beam peak of the equipment under test from the far-field data of the equipment under test.

In an embodiment, the system for measuring performance of equipment under test may further include at least one phase reference probe installed on an outside of the arc structure, and configured to receive a signal generated by the equipment under test to transmit the signal to a signal processing device, and the control unit may be configured to utilize phase information of a signal received from the phase reference probe as a reference phase.

In an embodiment, the system for measuring performance of equipment under test may include a plurality of phase reference probes, and the control unit may be configured to utilize a phase of a signal with higher power among signals received by each of the plurality of phase reference probes as a reference phase.

In an embodiment, the control unit may be configured to control at least one phase reference probe to perform the same rotation as the rotation of the equipment under test.

According to another aspect of the present disclosure, there is provided a method of measuring performance of equipment under test performed in a chamber, wherein the chamber includes a fixing part for fixing equipment under test which is to be tested, a positioner for controlling a rotation of the equipment under test by controlling the fixing part, a measurement probe which is installed at a predetermined location spaced apart from the fixing part while being hidden from a line-of-sight of the equipment under test, a curved reflector formed to reflect an electromagnetic wave radiated by the equipment under test in a direction of the measurement probe and to transform a spherical wave of the measurement probe into a plane wave at a location where an antenna under test is installed, an arc structure including an arc disposed around the fixing part so that a location of the fixing part becomes a central point, and a probe set including a plurality of near-field probes disposed to be spaced predetermined intervals apart from each other on an inner side of the arc, and wherein the method includes determining, by an equipment under test performance measurement system, a beam peak of the equipment under test based on signal data measured through at least some of the plurality of near-field probes, rotating, by the equipment under test performance measurement system, the equipment under test so that the beam peak of the equipment under test faces the reflector, and measuring, by the equipment under test performance measurement system, performance of the equipment under test based on signal data measured through the measurement probe.

In an embodiment, the determining of the beam peak of the equipment under test based on the signal data measured through at least some of the plurality of near-field probes may include generating near-field data of the equipment under test based on the signal data measured through at least some of the plurality of near-field probes, converting the near-field data of the equipment under test into far-field data, and determining the beam peak of the equipment under test from the far-field data of the equipment under test.

According to another aspect of the present disclosure, there is provided a computer program installed in a data processing device and stored on a non-transitory medium for performing the method described above.

Advantageous Effects

According to an embodiment of the present disclosure, there is an effect of enabling high-speed performance measurement (test) for AUTs of a plurality of bands or a broadband AUT.

In addition, according to another embodiment of the present disclosure, there is an effect of capable of measuring the performance of multiple measurement items for verification and post management of an AUT at high speed.

BRIEF DESCRIPTION OF DRAWINGS

In order to more fully understand the drawings cited in the detailed description of the present disclosure, a brief description of each drawing is provided.

DETAILED DESCRIPTION OF EXEMPLARY EMBODIMENTS

Figure 1A:
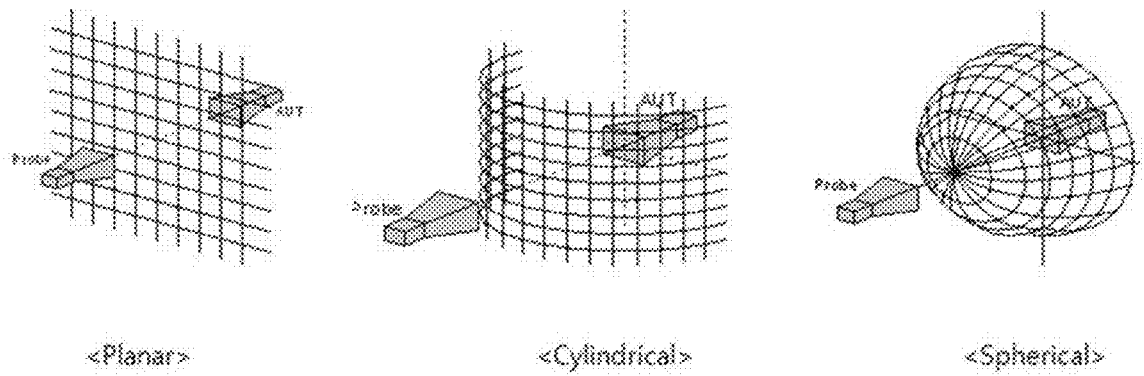
FIG. 1A and FIG. 1B are diagrams for explaining a conventional AUT measurement method.
Figure 1B:
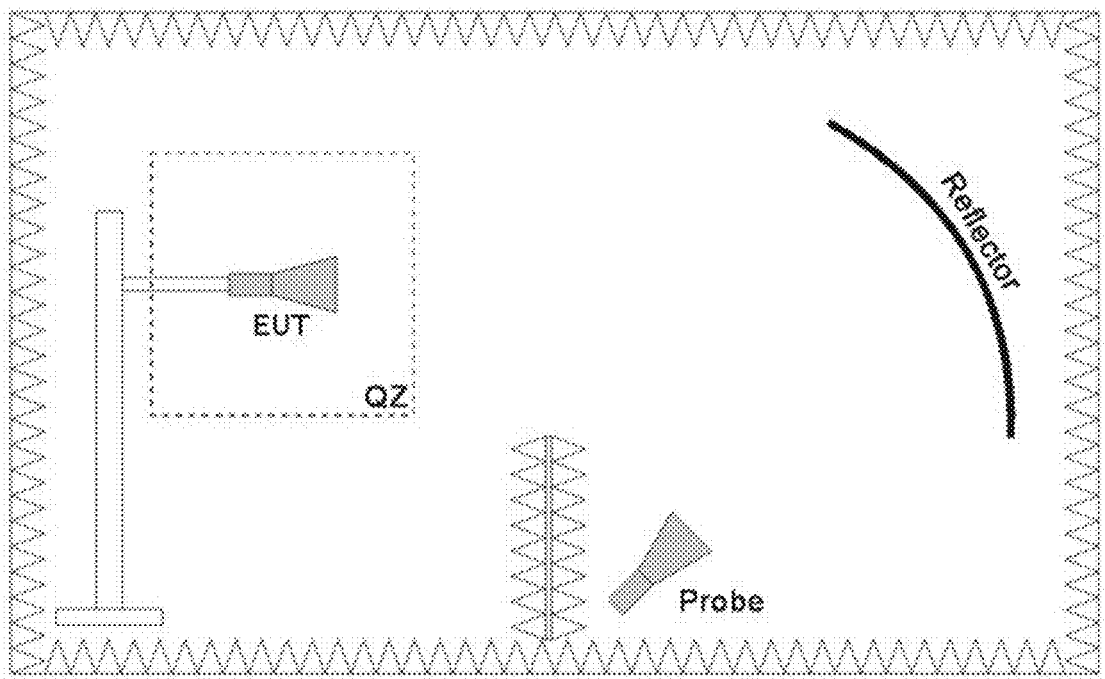

Since the present disclosure may be modified variously and have various embodiments, specific embodiments will be illustrated in the drawings and described in detail in the detailed description. However, this is not intended to limit the present disclosure to specific embodiments, and it should be understood to include all modifications, equivalents, and substitutes included in the spirit and scope of the present disclosure. In describing the present invention, if it is determined that a detailed description of related known technologies may obscure the gist of the present disclosure, the detailed description will be omitted.

Terms such as first and second may be used to describe various components, but the components should not be limited by the terms. The terms are used only for the purpose of distinguishing one component from another component.

The terms used in the present application are used only to describe a particular embodiment and are not intended to limit the present disclosure. Singular expressions include plural expressions unless the context clearly means otherwise.

In this specification, it should be understood that terms such as "include" or "have" are intended to designate the presence of features, numbers, steps, operations, components, parts, or combinations thereof described in the specification, but do not preclude the possibility of the presence or addition of one or more other features, numbers, steps, operations, components, parts, or combinations thereof.

Additionally, in this specification, when one component 'transmits' data to another component, this means that the component may transmit the data directly to the other component or transmit the data to the other component through at least one other component. Conversely, when one component 'directly transmits' data to another component, it means that the data is transmitted from the component to the other component without going through still other component.

Figure 2:
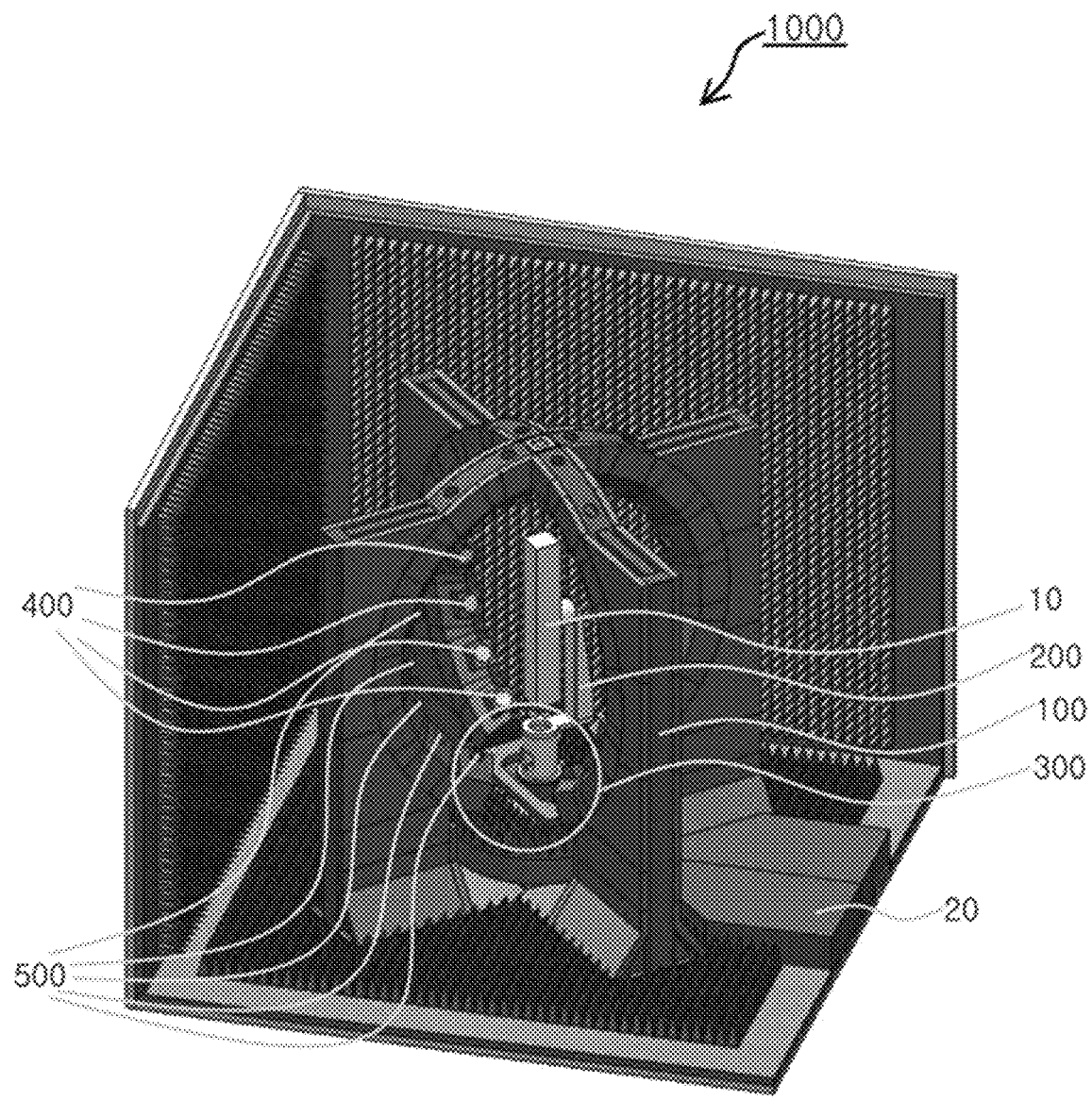
FIG. 2 is a diagram for showing a schematic structure of an EUT performance measurement system in accordance with an embodiment of the present disclosure.

FIG. 2 is a diagram for showing a schematic structure of an EUT performance measurement system in accordance with an embodiment of the present disclosure.

Referring to FIG. 2, in order to implement the EUT performance measurement method according to the technical idea of the present disclosure, an EUT performance measurement system 1000 may be provided.

The EUT performance measurement system 1000 may be provided in a predetermined chamber, and as shown in FIG. 2, a number of radio wave absorbers (e.g., pyramid-shaped radio wave absorbers) may be installed on the inner wall of the chamber so that the signals emitted by an EUT 10 is not reflected in the chamber. The EUT 10 may include an AUT that emits radio waves.

The EUT performance measurement system 1000 includes an arc structure 100.

In an embodiment, the arc structure 100 may form one or more arcs.

As shown in FIG. 2, when the arc structure 100 forms a plurality of arcs, a sphere space may be formed inside by the plurality of arcs.

In an embodiment of the present disclosure, a case where the arc structure 100 includes two arcs is exemplarily described for convenience of explanation, but an average expert in the technical field of the present disclosure may easily infer that the technical idea of the present disclosure may be easily applied even when having three or more arcs. Therefore, the scope of the present disclosure is not limited to the present embodiment.

A radio wave absorber may be similarly installed on the outer wall of the arc structure 100 and may be implemented to suppress the reflection of the signal output from the EUT 10.

Each of the arcs provided in the arc structure 100 may correspond to the outer periphery of the sphere space formed inside the arc structure 100, and each of the arcs may be provided to correspond to one frequency band.

When each of the arcs corresponds to any one frequency band, it may mean that any one arc may be used for testing a specific frequency band, and the other arc may be used for testing another frequency band.

To this end, a plurality of probes (400, 500) designed to effectively receive signals of corresponding frequency bands may be disposed in each arc.

Figure 3:
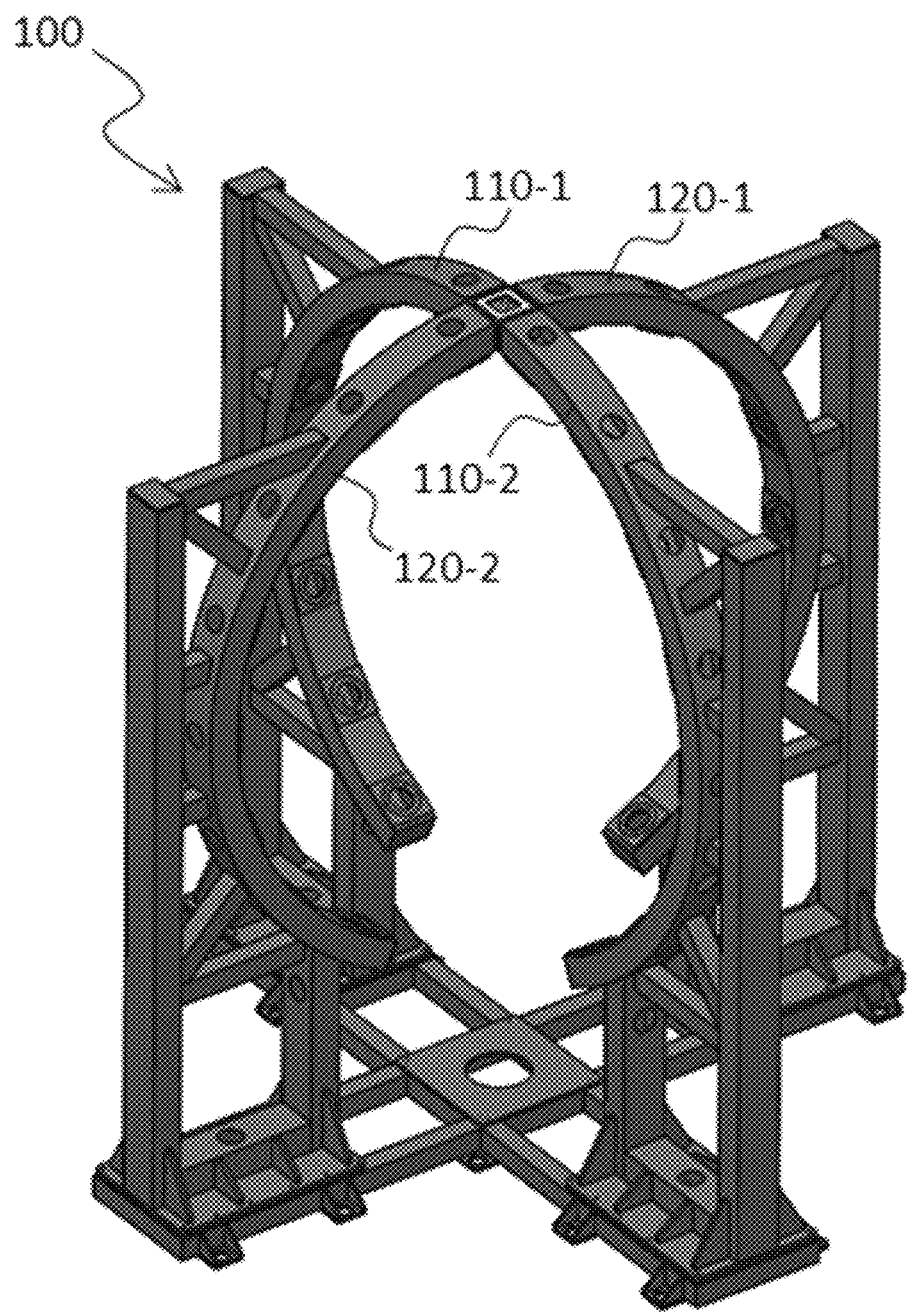
FIG. 3 is a diagram for explaining an arc structure in accordance with an embodiment of the present disclosure.

FIG. 3 is a diagram for explaining an arc structure in accordance with an embodiment of the present disclosure, and referring to FIGS. 2 and 3, the arc structure 100 may at least include a first arc (110-1 and 110-2) and a second arc (120-1 and 120-2).

In an embodiment of the present disclosure, the case where the arc structure 100 includes two arcs is illustrated, but as described above, the scope of the present disclosure is not limited thereto.

The first arc (110-1 and 110-2) and the second arc (120-1 and 120-2) may be formed to intersect at a predetermined intersection point 130.

The first arc (110-1 and 110-2) may include a first part 110-1 and a second part 110-2 that may be separated by the intersection point 130, and the second arc (120-1 and 120-2) may also include a first part 120-1 and a second part 120-2 that may be separated by the intersection point 130.

In addition, a support for supporting the first arc (110-1 and 110-2) and the second arc (120-1 and 120-2) may be provided as shown in FIG. 3.

A first probe set including a plurality of first probes 400 may be disposed on the inner side the first arc.

In addition, a second probe set including a plurality of second probes 500 may be disposed on the inner side the second arc.

A radio wave absorber may be attached on the outer side of the arc structure 100 as shown in FIG. 3 to have a shape as shown in FIG. 2.

In each arc, locations where probes may be disposed may be predetermined. At each location, the front side that receives the signal is disposed toward the sphere space, and a probe coupling structure may be formed on the outer side of the sphere space so that a signal line through which signals input to the probe are transmitted may be installed.

The coupling structure may have various embodiments, such as a manner in which a probe may be inserted, or mounted or fastened in a predetermined way.

The location of the probe coupling structure may be fixed. Further, the location where the probe is coupled in each of the arcs (110-1 and 110-2, 120-1 and 120-2) may be determined to have a fixed predetermined interval.

According to another embodiment, the coupling locations of the probes may be implemented to be variable. For example, a predetermined groove may be formed on the inner side of each of the arcs (110-1 and 110-2, 120-1 and 120-2) in the longitudinal direction of the arc, and the location of each probe coupled to the arc may be variably selected by sliding along the groove while a portion of each probe is fastened to the groove. Alternatively, it may be implemented so that the locations of the probes may be moved in various other ways.

Meanwhile, the EUT 10 is located inside the sphere space formed by the arc structure 100, and may radiate signals under the control of the EUT performance measurement system 1000 or voluntarily.

The signal radiated by the EUT 10 is received by probes disposed in each of the arcs, and the received input signal may be transmitted to the control unit through a signal processing device as will be described later.

Then, a test of an AUT may be performed where the radiation performance (radiation pattern and signal strength, etc.) is measured by the control unit.

The EUT 10 is fixed by a predetermined fixing part 200, and the fixing part 200 may be rotated by a positioner 300.

It is sufficient for the fixing part 200 to be implemented so as to fix the EUT 10 by mounting, attaching, or fastening, and the fixing part 200 may also have a radio wave absorber attached to the outer side, if possible, or may be implemented by a material with low radio wave reflection characteristics.

The movement of the fixing part 200 may be controlled by the positioner 300.

As will be described later, the positioner 300 may control the fixing part 200 to cause the EUT 10 to rotate in an azimuth direction (e.g., a horizontal direction of the arc structure 100) or to rotate in an elevation direction (e.g., a vertical direction of the arc structure 100).

The positioner 300 may perform a test while rotating the AUT 10 in the azimuth direction under the control of a control unit to be described later, and when the sampling interval on the sphere is wide, by rotating the EUT 10 at a certain angle in the elevation direction through the positioner 300 to tilt the EUT 10 and then rotating it in the azimuth direction, it may heave an effect of being able to acquire input signals at locations with narrower sampling intervals in space.

In addition, as shown in FIG. 2, a walkway 20 for a movement path of a person must be placed within the chamber, and it is preferable that the walkway 20 is also implemented as a radio wave absorber.

At this time, the walkway 20 may be designed to have a wedge shape between the arc structures 100 as shown in FIG. 2, thereby improving access to the center of the arc structure 100.

Figure 4:
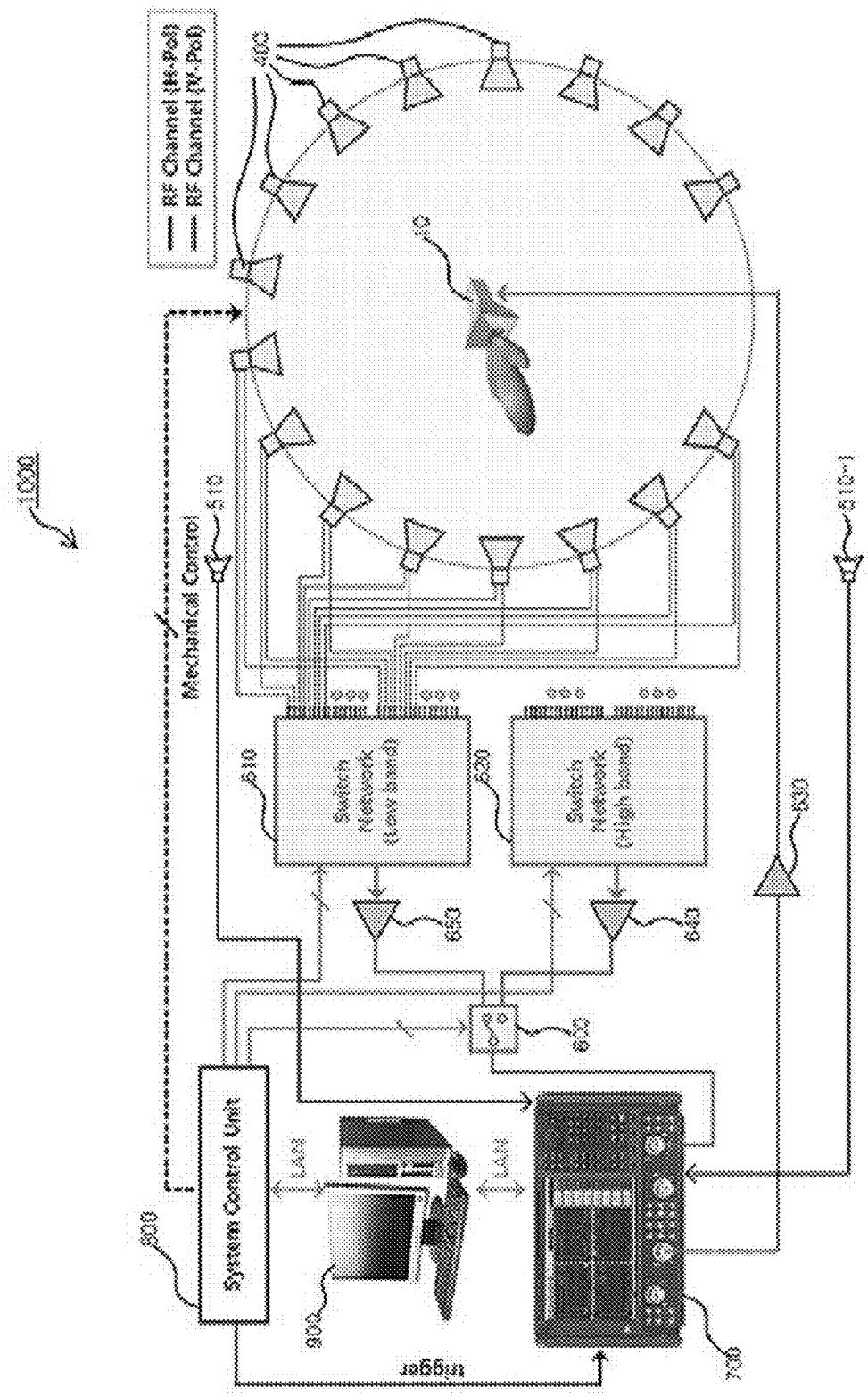
FIG. 4 is a diagram for explaining a configuration of an EUT performance measurement system in accordance with an embodiment of the present disclosure.

The EUT performance measurement system 1000 shown in FIG. 2 is explained mainly on the structure within the chamber, and the configuration from a data processing perspective for performance measurement may be the same as FIG. 4.

FIG. 4 is a diagram for explaining a configuration of an EUT performance measurement system in accordance with an embodiment of the present disclosure.

Referring to FIG. 4, the EUT performance measurement system 1000 according to the technical idea of the present disclosure may include a control unit 800 in addition to the arc structure 100, the fixing part 200, and the positioner 300 described in FIG. 2.

In addition, the EUT performance measurement system 1000 may further include a signal analyzer 700.

The control unit 800 may control other components (e.g., positioner 300, signal analyzer 700, band selection switch 600, and/or probe selection switches 610, 620, etc.) provided in the EUT performance measurement system 1000 in order to implement the EUT performance measurement method according to the technical idea of the present disclosure.

To this end, the control unit 800 may include a processor and a storage medium to implement the functions defined in this specification. The processor may refer to a computing device capable of executing a predetermined program (software code) and may be named by various names such as an implementation example of the data processing device or a vendor mobile processor, microprocessor, CPU, single processor, or multiprocessor.

An average expert in the technical field of the present disclosure may easily infer that the processor may run the program to perform data processing (e.g., control of other configurations, derivation of radiation performance, etc.) necessary for the technical idea of the present disclosure.

The storage medium may refer to a device in which a program for implementing the technical idea of the present disclosure is stored/installed. The storage medium may be divided into a plurality of different physical devices depending on the implementation example, and a portion of the storage medium may exist inside the processor depending on the implementation example. The storage medium may be implemented as a hard disk, solid state disk (SSD), optical disk, random access memory (RAM), and/or various other types of storage media depending on the implementation example, and may be implemented to be detachable from the control unit 800 if necessary.

The control unit 800 may be implemented as a data processing device such as a computer, laptop, or server, but is not limited thereto, and may be implemented as any data processing device (e.g., mobile terminal, etc.) capable of processing data to execute the program.

In addition, an average expert in the technical field of the present disclosure may easily infer that the control unit 800 may be equipped with the processor, the storage medium, and various peripheral devices (e.g., input/output devices, display devices, audio devices, etc.) provided in the control unit 800, and a communication interface (e.g., a communication bus, etc.) for connecting these devices.

The control unit 800 may perform a multi-band AUT high-speed measurement method according to the technical idea of the present disclosure while communicating with a predetermined manager terminal 900.

Although FIG. 4 shows an example in which the control unit 800 and the manager terminal 900 are implemented as separate devices, an average expert in the technical field of the present disclosure may easily infer that the manager terminal 900 and the control unit 800 may be implemented as one physical device, depending on the need.

The control unit 800 may control the band selection switch 600 to select a frequency band to be tested, i.e., an arc. For example, one of the first arc (110-1 and 110-2) and the second arc (120-1 and 120-2) may correspond to a first band (e.g., 3.5 GHz), and the other may correspond to a second band (e.g., 28 GHz).

The control unit 800 may select the frequency band corresponding to the AUT 10 through the band selection switch 600. Then, the first arc (110-1 and 110-2) corresponding to the selected frequency band (e.g., first band) may be selected.

Then, the control unit 800 may sequentially receive input signals from the probes included in a first probe set 400 corresponding to the selected arc (e.g., first arc (110-1 and 110-2)) through the signal analyzer 700.

The control unit 800 may control the probe selection switches 610, 620 to sequentially select probes.

The first probe selection switch 610 may be a configuration to select any one probe from the first probe set 400, and the second probe selection switch 620 may be a configuration to select any one probe from the second probe set 500.

The input signal received by each of the probes may be transmitted to the signal analyzer 700 through the probe selection switches 610, 620. Each of the probes may transmit input signals corresponding to two channels (H-pol, V-pol), respectively.

In addition, the transmitted input signal may be amplified through low-noise amplifiers 640, 650 as needed and then transmitted to the signal analyzer 700.

The signal analyzer 700 may process input signals received from probes to extract data for measuring radiation performance and transmit the data to the control unit 800.

Then, the control unit 800 may derive the radiation performance (e.g., radiation pattern, intensity, etc.) of the EUT 10 based on the data received from the signal analyzer 700.

The function or operation of the signal analyzer 700 for extracting necessary data from input signals received from a plurality of probes, and the algorithm for deriving radiation performance from such data are widely known, so the detailed description will be omitted in this specification.

Meanwhile, the control unit 800 may control the signal analyzer 700 to transmit the output signal output from the AUT 10. Even in this case, a low-noise amplifier may be provided between the signal analyzer 700 and the AUT 10.

And in this method, the control unit 800 may know the phase of the output signal transmitted by itself, so a separate reference phase is not needed. However, for an AUT that independently outputs signals in an over the air (OTA) manner, an accurate reference phase may be required to measure radiation performance. And based on the reference phase, phase information of the input signal received from each probe may be estimated.

To this end, the EUT performance measurement system 1000 may be further equipped with at least one phase reference probe 510, 510-1.

The phase reference probe 510, 510-1 may be installed at a predetermined location within the chamber and outside the arc structure 100.

The phase reference probe 510, 510-1 may also receive signals generated by the AUT 10 and transmit to the signal analyzer 700, and the signal analyzer 700 may measure phase information and transmit them to the control unit 800.

According to an embodiment, the EUT performance measurement system 1000 may be provided with a plurality of phase reference probes 510, 510-1, and each of the phase reference probes 510, 510-1 may be placed at a certain distance or more from each other.

At this time, the control unit 800 may utilize the phase of a signal with higher power among the signals received by each of the plurality of phase reference probes 510, 510-1 as reference phase information. When a plurality of phase reference probes 510, 510-1 are provided, there is an effect of preventing the risk that the phase reference probes 510, 510-1 are present in a null direction/position.

In addition, each of the phase reference probes 510, 510-1 may also be connected to a driving device (not shown) capable of performing a predetermined rotational movement.

The control unit 800 may control the rotation of the phase reference probes 510, 510-1 by controlling the driving device (not shown).

For example, the control unit 800 may control the driving device (not shown) to perform the same rotation as the rotation of the EUT 10, and in this case, even when the EUT 10 rotates, the phase reference probes 510, 510-1 may be controlled to be located at the same point in the radiation pattern of the EUT 10.

In order for the control unit 800 to measure the performance of the EUT 10, the arc corresponding to the EUT 10 may first be selected through the band selection switch 600.

For example, when the first arc (110-1 and 110-2) is selected, the control unit 800 may sequentially select probes included in the first probe set 400 using the first probe selection switch 610 and receive input data from the signal analyzer 700.

When input data is received from all probes included in the first probe set 400, the control unit 800 may control the positioner 300 to rotate the EUT 10 at a certain angle in the elevation direction. Further, the EUT 10 may be rotated at a certain angle in the azimuth direction. The order of rotation in the elevation direction and rotation in the azimuth direction may be changed. Then, the probes included in the first probe set 400 may be sequentially selected to receive input data from the signal analyzer 700.

In this way, after performing rotation of the elevation direction and/or azimuth direction of the EUT, receiving input data is repeated, and when input data for sufficient grid points are collected in the sphere space, the control unit 800 may complete the test by deriving the radiation performance.

Afterwards, when performing a test of the same AUT or a different AUT, if a test for the second band is necessary, the control unit 800 may also perform a test for the second band by simply selecting the second band.

Referring again to FIG. 3, the arc structure 100 has the first arc (110-1 and 110-2) and the second arc (120-1 and 120-2) intersecting at the intersection point 130, and at this time, when a predetermined probe is installed at the intersection point 130, it is preferable that the probe corresponds to both the first band and the second band.

To this end, the probe disposed at the intersection point 130 may be a broadband probe capable of receiving signals corresponding to both the first band and the second band.

Meanwhile, since the difference in frequency bands between the first band and the second band is large, it may not be easy to implement a probe that covers both. For various other reasons, it may not be desirable or easy to dispose a broadband probe at the intersection point 130.

In this case, the arc structure 100 may be implemented so that a probe coupling structure corresponding to the intersection point 130 is able to easily replace the probe. For example, in order to selectively and easily replace the probe, the probe coupling structure corresponding to the intersection point 130 may have a groove for inserting and removing the probe, or may be implemented to facilitate replacement of the probe in various other methods such as a mounting structure.

In this way, when a coupling structure that facilitates replacement of the probe is adopted at the intersection point 130, when testing an AUT corresponding to the first band, a probe corresponding to the first band is disposed at the intersection point 130, and when testing an AUT corresponding to the second band, a probe corresponding to the second band is disposed, so that there is an effect that testing of EUT including a multiple band AUT may be quickly performed simply by replacing the probe at the location corresponding to the intersection point 130.

According to another embodiment, the first probes 400 disposed in the first arc (110-1 and 110-2) and the second probes 500 disposed in the second arc (120-1 and 120-2) may be disposed to be spaced predetermined intervals apart from each other. The interval between the first probes 400 and the interval between the second probes 500 may be different.

And at this time, no probe may be disposed at all at the intersection point 130 through the disposal of the probes for the interval. This is because the intersection point 130 of the arc has different physical/spatial characteristics compared to other locations due to the intersection of the structure, and due to this problem, it may be preferable not to measure the signal at the location corresponding to the intersection point 130 if possible.

In addition, when testing the EUT 10, it may be desirable to ensure that the direction of the main beam of the EUT 10 is not directed toward the intersection point 130.

To this end, the fixing part 200 may be disposed so that the direction (i.e., main beam direction) of the EUT 10 is perpendicular to the intersection point 130. For example, in FIG. 2, when the intersection point 130 is located at the vertical top of the EUT 10 in the drawing, the EUT 10 may be installed in a direction (e.g., a predetermined direction on a horizontal plane) perpendicular to a line connecting the intersection point 130 and the AUT.

Figure 5:
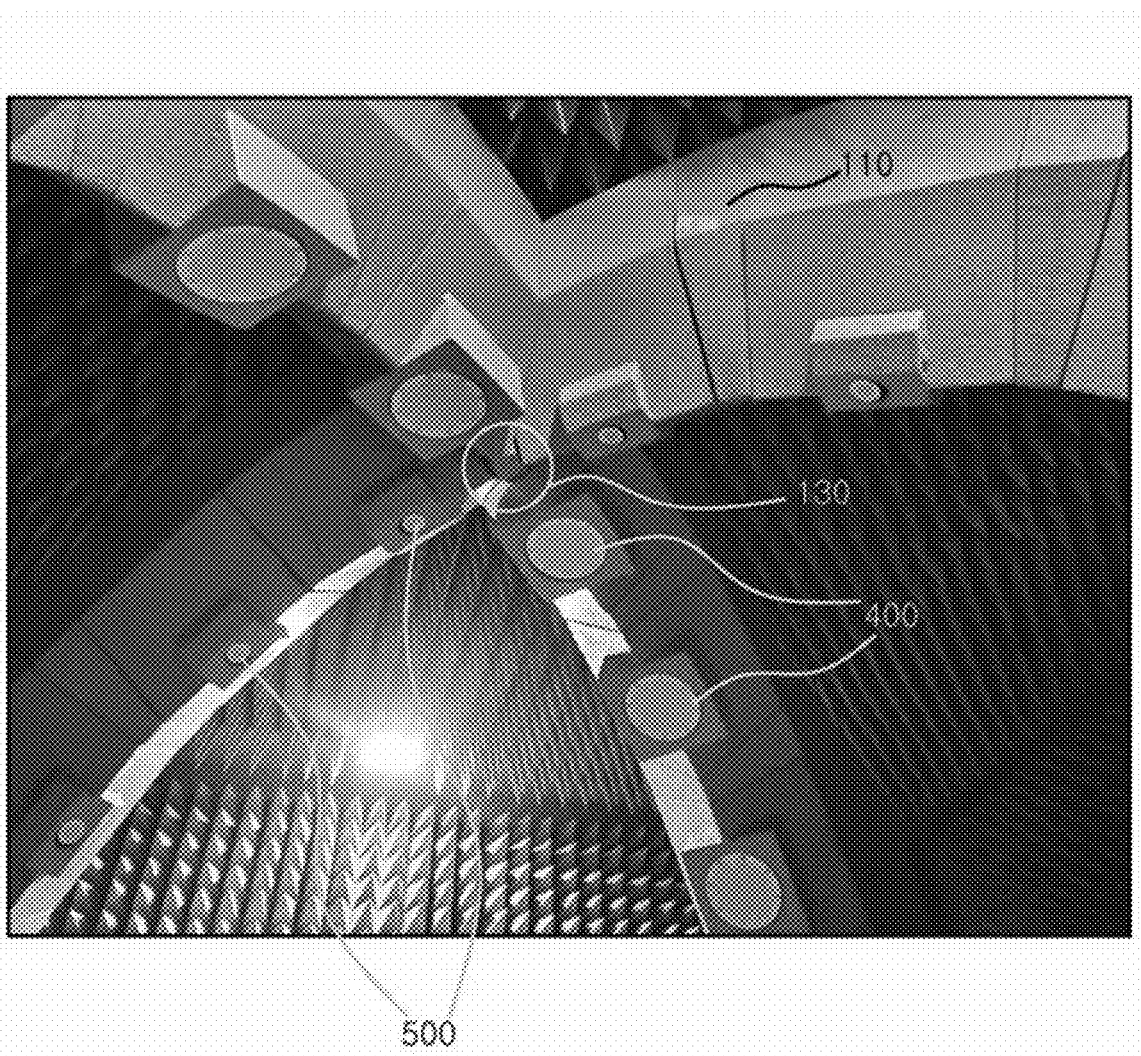
FIG. 5 is a diagram for explaining an example of an intersection point of an arc structure in accordance with an embodiment of the present disclosure.

Meanwhile, an embodiment of the intersection point 130 is shown in FIG. 5.

FIG. 5 is a diagram for explaining an example of an intersection point of an arc structure in accordance with an embodiment of the present disclosure.

FIG. 5 shows an enlarged photograph of the first arc (110-1 and 110-2) the second arc (120-1 and 120-2), and the intersection point 130 of the first arc (110-1 and 110-2) and the second arc (120-1 and 120-2), and as shown in FIG. 5, first probes may be disposed at regular intervals in the first arc (110-1 and 110-2), and second probes may be disposed at regular intervals in the second arc (120-1 and 120-2), but no probes may be disposed at the intersection point 130.

Through this, there is an effect of reducing the inconvenience of replacing the probe or the problem of errors occurring due to physical/spatial specificity at the location even if a broadband probe is used.

Figure 6:
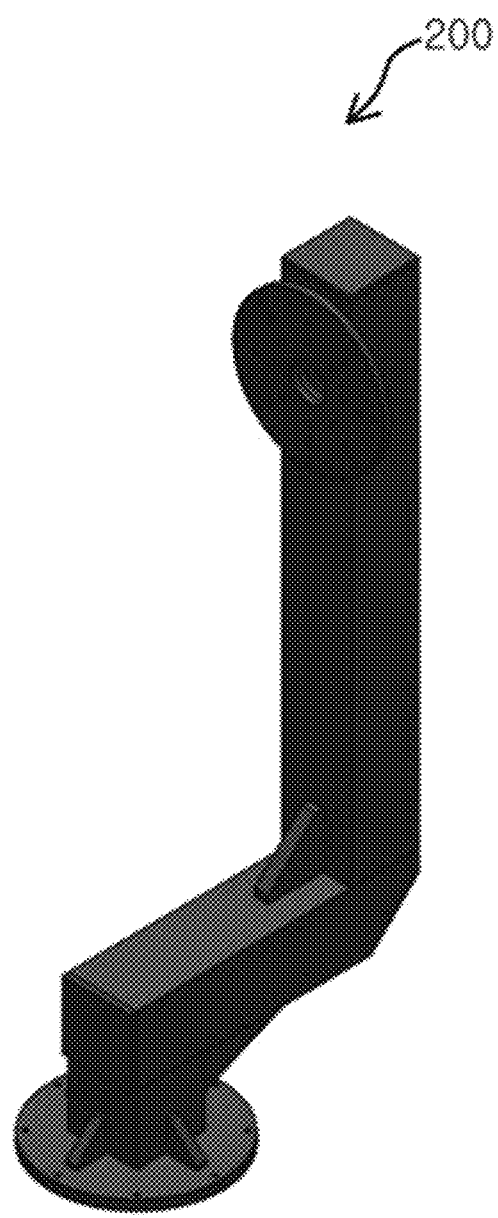
FIG. 6 is a diagram for explaining an example of a fixing part in accordance with an embodiment of the present disclosure.

FIG. 6 is a diagram for explaining an example of a fixing part in accordance with an embodiment of the present disclosure.

Referring to FIG. 6, the fixing part 200 may include an attachment structure (for example, a disk-shaped structure in FIG. 6) to which EUT 10 may be added as shown in FIG. 6, and a vertical support that vertically supports the attachment structure.

Since such a vertical support may affect the radiation of radio waves in the case of an omnidirectional AUT, it may be desirable to implement it to have as narrow a width as possible.

In addition, when the vertical support is parallel to the axis of rotation of the positioner 300, there is a problem that the rotation of the EUT 10 occurs only in an excessively limited range, so a horizontal support may be further provided to expand the rotation radius as shown in FIG. 6, and one end of this horizontal support may be connected to the rotation axis of the positioner 300 and the other end may be connected to the vertical support.

Other embodiments of the fixing part 200 may vary.

Figure 7:
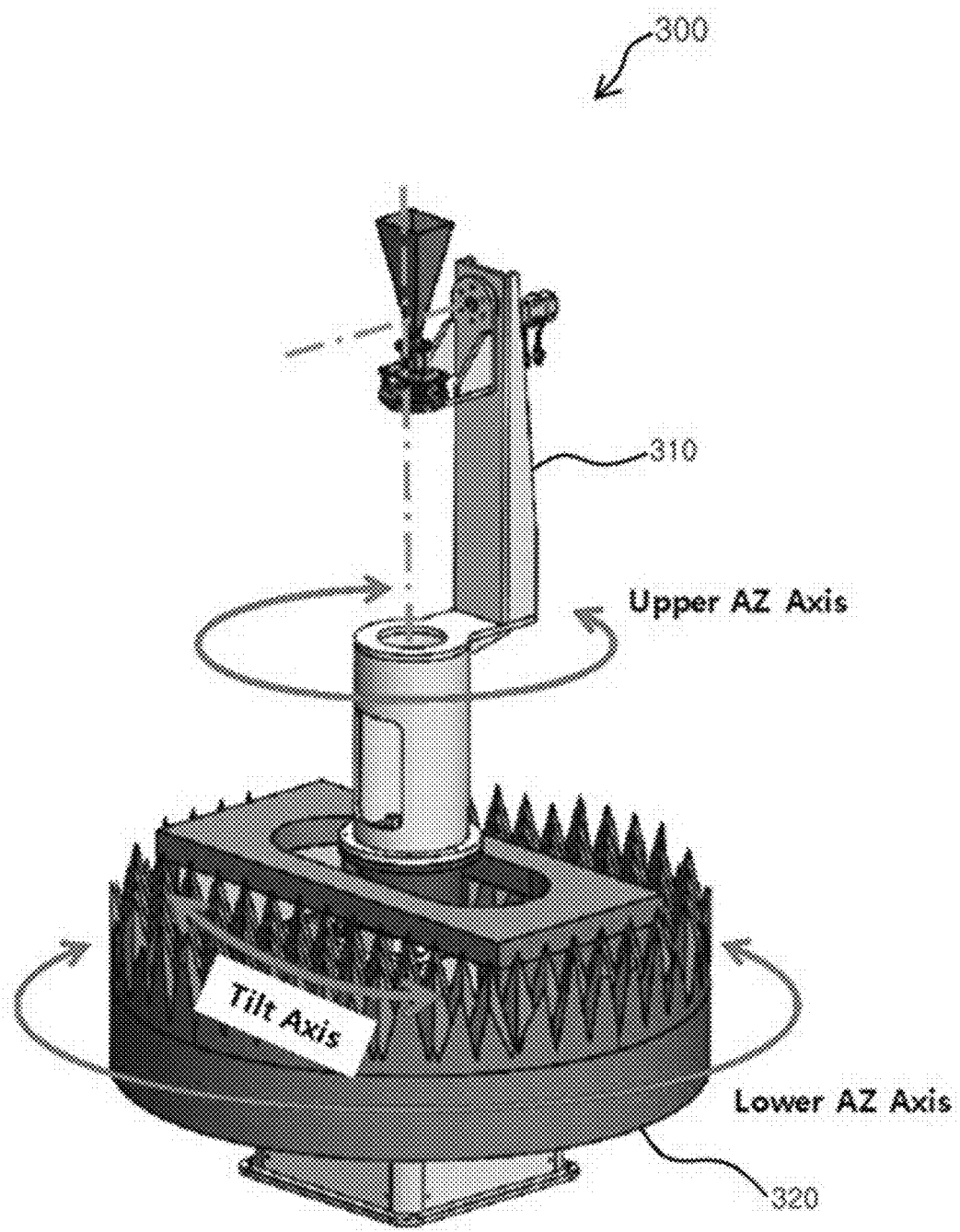
FIG. 7 is a diagram for explaining an example of a positioner in accordance with an embodiment of the present disclosure.

FIG. 7 is a diagram for explaining an example of a positioner in accordance with an embodiment of the present disclosure.

Referring to FIG. 7, the positioner 300 may be a mechanical device that controls the rotation of the fixing part 200 under the control of the control unit 800.

In other words, a device that controls the rotation of the EUT 10, may rotate the EUT 10 in the azimuth direction (AZ Axis), and may also rotate the EUT 10 in the elevation direction (Tilt Axis) is sufficient.

According to an embodiment, the positioner 300 may be provided with an upper positioner 310 to which the fixing part 200 is coupled and a lower positioner 320 that drives rotation of the upper positioner 310.

The upper positioner 310 may be implemented to rotate the EUT 10 in the azimuth direction when performing a test, and may be implemented to be able to rotate independently from the lower positioner 320.

In addition, the lower positioner 320 is implemented to rotate the upper positioner 310 to a location suitable for the corresponding arc when selecting an arc, and may rotate the upper positioner 310 at a certain angle in the vertical direction, i.e., in the elevation direction (Tilt Axis).

In addition, as shown in FIG. 7, a predetermined radio wave absorber may be provided on the outer side of the lower positioner 320.

In the end, according to the technical idea of the present disclosure, by providing an arc for each band and disposing a plurality of probes on each arc, there is an effect that it is possible to measure AUT performance for different bands at high speed through these.

However, the EUT performance measurement system 1000 according to the above-described embodiment has a disadvantage in that it cannot measure some measurement items required for verification and post management of EUT including an AUT, especially EVM or blocking. Therefore, in order to overcome the disadvantage, an EUT performance measurement system with a modified structure is further proposed, and this will be described in more detail below. However, in cases where the content described above is applied as is or may be applied very easily by a person skilled in the art, detailed explanation will be omitted.

Figure 8:
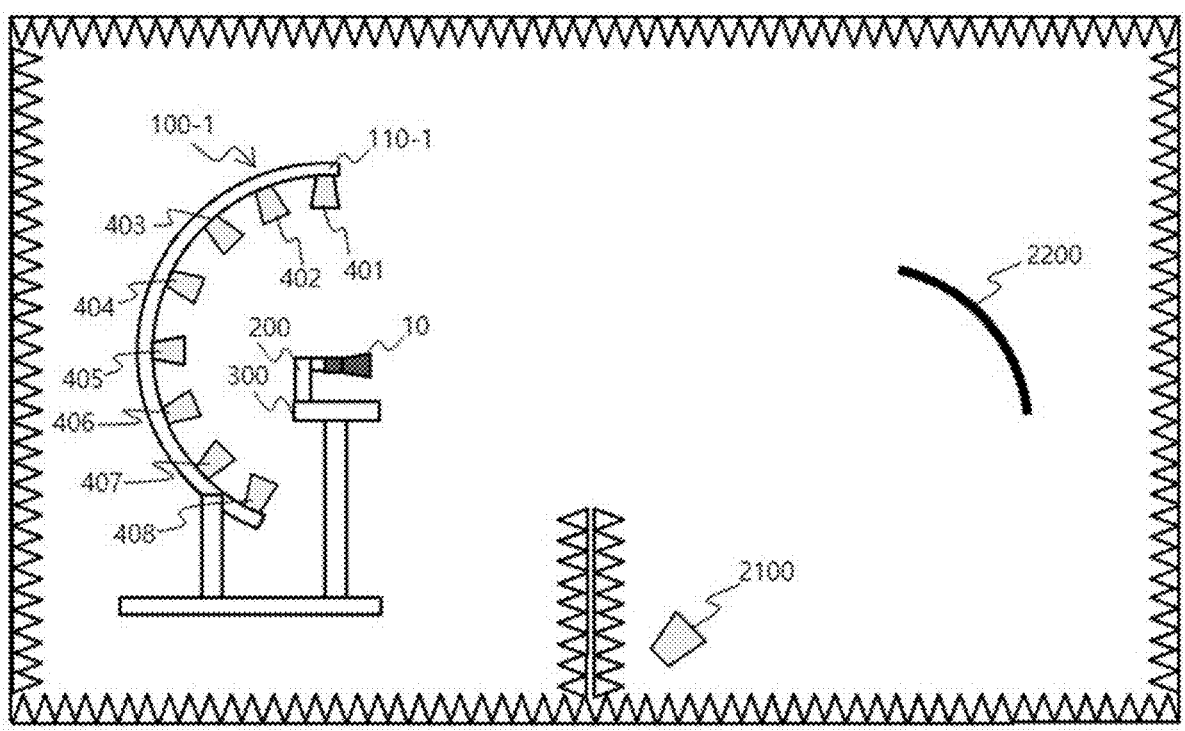
FIG. 8 is a diagram for explaining a schematic structure of an EUT performance measurement system in accordance with another embodiment of the present disclosure.

FIG. 8 is a diagram for explaining a schematic structure of an EUT performance measurement system in accordance with another embodiment of the present disclosure. FIG. 8 schematically shows a side view (more precisely, a vertical cross section including a straight line connecting EUT and a reflector) of the EUT performance measurement system 2000.

Referring to FIG. 8, the EUT performance measurement system 2000 may include a fixing part 200 for fixing EUT 10, and a positioner 300 for controlling the rotation of the EUT 10 by controlling the fixing part 200.

The EUT performance measurement system 2000 may be installed in a chamber, and as shown in FIG. 8, a plurality of radio wave absorbers may be installed on the inner wall of the chamber.

In addition, the EUT performance measurement system 2000 may further include an arc structure 100 including an arc 110-1 disposed around the fixed part 200 so that the location of the EUT 10 becomes a central point. On the inner side of the arc 110-1, a plurality of near-field probes 401 to 408 may disposed to be spaced predetermined intervals apart from each apart. The plurality of near-field probes 401 to 408 may receive near-field electromagnetic waves radiated by the EUT 10, and may be driven simultaneously to shorten measurement time.

Meanwhile, the EUT performance measurement system 2000 may further include a measurement probe 2100 and a curved reflector 2200.

The curved reflector 2200 may reflect electromagnetic waves radiated by the EUT 10 in the direction of the measurement probe 2100, and a curved surface may be formed so that the spherical wave of the measurement probe 2100 is transformed into a plane wave at the location where the EUT 10 is installed.

The measurement probe 2100 may be installed at a predetermined location spaced apart from the fixing part 200 while being hidden from the line-of-sight of the EUT 10. In order to hide the measurement probe 2100 from the line-of-sight of the EUT 10, a radio wave absorber may be provided between the EUT 10 and the measurement probe 2100.

The arc structure 100 of FIG. 8 may include one arc 110-1. For example, the arc structure 100 of FIG. 8 may be a form in which the second arc (120-1 and 120-2) and the first part 110-1 of the first arc are removed from the arc structure shown in FIG. 3.

In addition, as shown in FIG. 8, according to an embodiment of the present disclosure, the arc 110-1 may be formed so that the plurality of near-field probes 401 to 408 disposed on the inner side of the arc 110-1 are located on an opposite side of the curved reflector 2200 with respect to the EUT 10.

Figure 9:
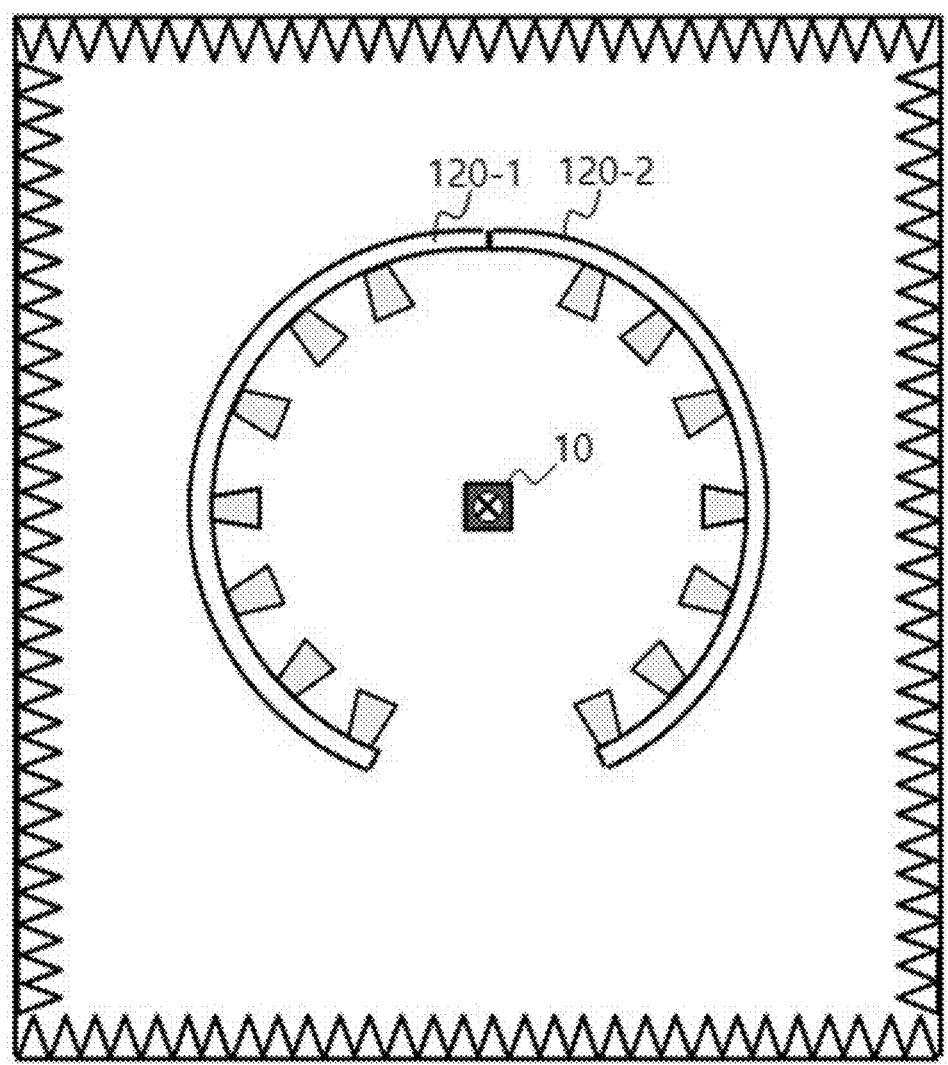
FIG. 9 is a diagram illustrating an example in which an arc is located on a side surface of EUT.

However, the location of the arc is not limited thereto, and the arc may be located at various locations around the EUT 10. FIG. 9 is a diagram illustrating an example in which an arc is located on a side surface of EUT 10 rather than on a rear surface (see FIG. 8). FIG. 9 schematically illustrates a back view (more precisely, a vertical cross-section including a plane formed by the arc and perpendicular to a straight line connecting EUT and a reflector) of the EUT performance measurement system 2000.

Referring to FIG. 9, the arc (120-1 and 120-2) may be formed so that the plurality of near-field probes disposed on the inner side of the arc (120-1 and 120-2) are located on the lateral side of the EUT 10 based on the direction in which the EUT 10 faces the curved reflector 2200. In the example of FIG. 9, the arc structure 100 may be in a form in which the first arc (110-1 and 110-2) is removed from the arc structure shown in FIG. 3.

Meanwhile, the EUT performance measurement system 2000 according to the embodiment of FIG. 8 or FIG. 9 may also further include the control unit 800 for measuring the performance of the EUT 10.

In particular, the control unit 800 may measure the performance of the EUT 10 by receiving signal data corresponding to the input signal from at least some of the plurality of near-field probes 401 to 408 and the measurement probe 2100 through a signal analyzer.

Figure 10:
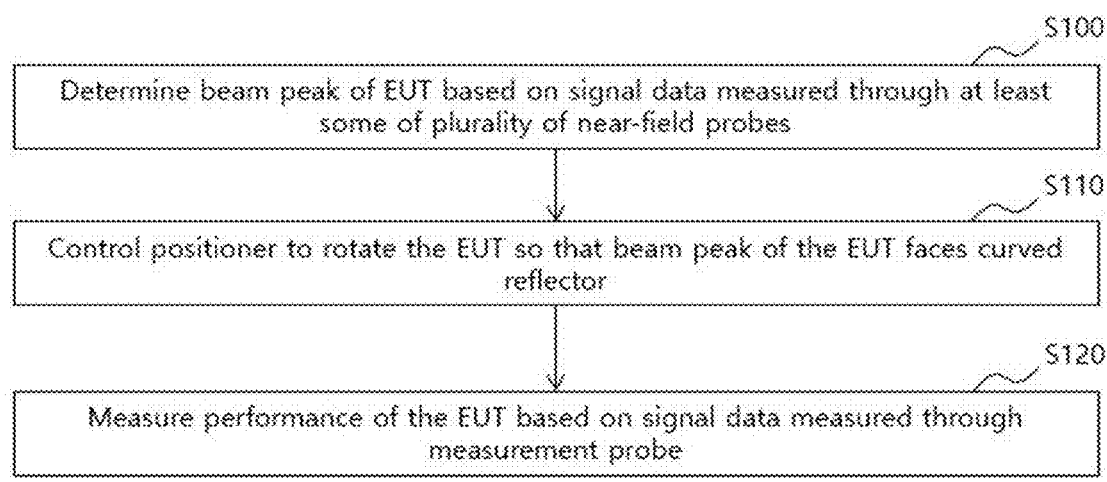
FIGS. 10 and 11 are diagrams illustrating a specific process of measuring performance of EUT by an EUT performance measurement system in accordance with another embodiment of the present disclosure.
Figure 11:
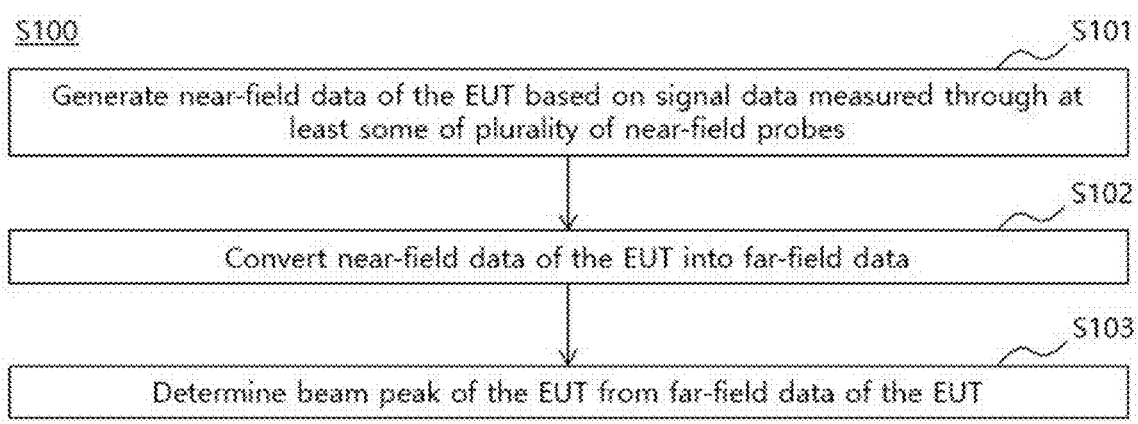

A specific process by which the control unit 800 measures the performance of the EUT 10 is shown in FIGS. 10 and 11.

First, referring to FIG. 10, the control unit 800 may determine the beam peak of the EUT 10 based on signal data measured through at least some of the plurality of near-field probes 401 to 408 (S100).

In an embodiment, the control unit 800 may control the positioner 300 to rotate the EUT 10 in the azimuth direction and/or the elevation direction while collecting signal data measured through at least some of the plurality of near-field probes, and may determine the beam peak when the EUT 10 assumes a specific posture based on the collected signal data.

Meanwhile, the control unit 800 may find the beam peak by converting near-field data into far-field data, a specific example of which is shown in FIG. 11. Referring to FIG. 11, the control unit 800 may generate near-field data of the EUT 10 based on signal data measured through at least some of the plurality of near-field probes 401 to 408 (S101).

Thereafter, the control unit 800 may convert the near-field data of the EUT 10 into far-field data, and at this time, the control unit 800 may convert near-field data into far-field data by performing various known conversion methods such as the NTFT algorithm.

Thereafter, the control unit 800 may determine the beam peak of the EUT 10 from the far field data of the EUT 10.

Referring again to FIG. 10, the control unit 800 may control the positioner 300 to rotate the EUT 10 so that the beam peak of the EUT 10 faces the curved reflector 2200 (S110). Accordingly, the beam peak of the electromagnetic wave radiated by the EUT 10 after rotation may be reflected by the curved reflector 2200 and directed to the measurement probe 2100.

Thereafter, the control unit 800 may measure the performance of the EUT 10 based on the signal data measured through the measurement probe 2100 (S120). For example, the control unit 800 may measure the performance of measurement items for verification and post management of EUT, such as EIPR, TRP, EVM, spurious emission, and blocking.

Meanwhile, the EUT performance measurement method performed by the EUT performance measurement system 1000 or 2000 described above may be implemented in the form of computer-readable program instructions and stored in a non-transitory computer-readable recording medium, and the control program and target program according to an embodiment of the present disclosure may also be stored in a non-transitory computer-readable recording medium. A non-transitory computer-readable recording medium includes all types of recording devices in which data that may be read by a computer system is stored.

Program instructions recorded on the recording medium may be those specifically designed and configured for the present disclosure, or may be known and available to those skilled in the software field.

Examples of the non-transitory computer-readable recording medium include magnetic media such as a hard disk, a floppy disk, and a magnetic tape, optical media such as a CD-ROM and a DVD, magneto-optical media such as a floptical disk, and hardware devices specially configured to store and perform program instructions such as a ROM, a RAM, and a flash memory. In addition, the non-transitory computer-readable recording medium is distributed in computer systems connected through a network, so that computer-readable codes may be stored and executed in a distributed manner.

Examples of program instructions include not only machine language code such as that created by a compiler, but also high-level language code that can be executed by a device that electronically processes information using an interpreter, for example, a computer.

The hardware devices described above may be configured to operate as one or more software modules to perform the operations of the present disclosure, and vice versa.

The above description of the present disclosure is for illustrative purposes, and those skilled in the art will understand that the present disclosure may be easily modified into other specific forms without changing the technical idea or essential features of the present disclosure. Therefore, the embodiments described above should be understood in all respects as illustrative and not restrictive. For example, each component described as unitary may be implemented in a distributed manner, and similarly, components described as distributed may also be implemented in a combined form.

The scope of the present disclosure is indicated by the appended claims rather than the detailed description above, and all changes or modified forms derived from the meaning and scope of the claims and their equivalent concepts should be construed as being included in the scope of the present disclosure.

INDUSTRIAL APPLICABILITY

The present disclosure may be used for a system for measuring performance of equipment under test and a method therefor.

The invention claimed is:

1. A system for measuring performance of equipment under test, the system comprising:
   a fixing part for fixing equipment under test which is to be tested;
   a positioner for controlling a rotation of the equipment under test by controlling the fixing part;
   a measurement probe which is installed at a predetermined location spaced apart from the fixing part while being hidden from a line-of-sight of the equipment under test;
   a curved reflector formed to reflect an electromagnetic wave radiated by the equipment under test in a direction of the measurement probe and to transform a spherical wave of the measurement probe into a plane wave at a location where the equipment under test is installed;
   an arc structure comprising an arc disposed around the fixing part so that the location of the equipment under test becomes a central point;
   a probe set comprising a plurality of near-field probes disposed to be spaced predetermined intervals apart from each other on an inner side of the arc; and
   a control unit for measuring performance of the equipment under test by receiving signal data corresponding to an input signal from at least some of the plurality of near-field probes and the measurement probe through a signal analyzer.

2. The system of claim 1, wherein the arc is formed so that the plurality of near-field probes disposed on the inner side of the arc are located on an opposite side of the curved reflector with respect to the equipment under test.

3. The system of claim 1, wherein the arc is formed so that the plurality of near-field probes disposed on the inner side of the arc are located on a lateral side of the equipment under test based on a direction in which the equipment under test faces the curved reflector.

4. The system of claim 1, wherein the control unit is configured to, by controlling the positioner, perform a test while rotating the equipment under test at a predetermined angle in an elevation direction and then rotating the equipment under test in an azimuth direction.

5. The system of claim 1, wherein the control unit is configured to:
   determine a beam peak of the equipment under test based on signal data measured through at least some of the plurality of near-field probes;
   control the positioner to rotate the equipment under test so that the beam peak of the equipment under test faces the curved reflector; and
   measure the performance of the equipment under test based on signal data measured through the measurement probe.

6. The system of claim 5, wherein, in order to determine the beam peak of the equipment under test, the control unit is configured to:
   generate near-field data of the equipment under test based on the signal data measured through at least some of the plurality of near-field probes;
   convert the near-field data of the equipment under test into far-field data; and
   determine the beam peak of the equipment under test from the far-field data of the equipment under test.

7. The system of claim 1, wherein the system further comprises at least one phase reference probe installed on an outside of the arc structure, and configured to receive a signal generated by the equipment under test to transmit the signal to a signal processing device, and
   the control unit is configured to utilize phase information of a signal received from the phase reference probe as a reference phase.

8. The system of claim 7, wherein the system comprises a plurality of phase reference probes, and
   the control unit is configured to utilize a phase of a signal with higher power among signals received by each of the plurality of phase reference probes as a reference phase.

9. The system of claim 7, wherein the control unit is configured to control at least one phase reference probe to perform the same rotation as the rotation of the equipment under test.

10. A method of measuring performance of equipment under test performed in a chamber, wherein the chamber comprises:
    a fixing part for fixing equipment under test which is to be tested;
    a positioner for controlling a rotation of the equipment under test by controlling the fixing part;
    a measurement probe which is installed at a predetermined location spaced apart from the fixing part while being hidden from a line-of-sight of the equipment under test;
    a curved reflector formed to reflect an electromagnetic wave radiated by the equipment under test in a direction of the measurement probe and to transform a spherical wave of the measurement probe into a plane wave at a location where the equipment under test is installed;
    an arc structure comprising an arc disposed around the fixing part so that a location of the fixing part becomes a central point; and
    a probe set comprising a plurality of near-field probes disposed to be spaced predetermined intervals apart from each other on an inner side of the arc,
    the method comprising:
    determining, by an equipment under test performance measurement system, a beam peak of the equipment under test based on signal data measured through at least some of the plurality of near-field probes;
    rotating, by the equipment under test performance measurement system, the equipment under test so that the beam peak of the equipment under test faces the curved reflector; and
    measuring, by the equipment under test performance measurement system, performance of the equipment under test based on signal data measured through the measurement probe.

11. The method of claim 10, wherein the determining of the beam peak of the equipment under test based on the signal data measured through at least some of the plurality of near-field probes comprises:
    generating near-field data of the equipment under test based on the signal data measured through at least some of the plurality of near-field probes;
    converting the near-field data of the equipment under test into far-field data; and
    determining the beam peak of the equipment under test from the far-field data of the equipment under test.

12. A computer program installed in a data processing device and stored on a non-transitory medium for performing the method of claim 10.

\* \* \* \* \*